Patented July 29, 1952

2,605,255

UNITED STATES PATENT OFFICE 2,605,255

TETRAMETHYL-THIURAM-DISULFIDE

Martin L. Nadler, Wilmington, Del., assignor to E. I. du Pont de Nemours & Company, Wilmington, Del., a corporation of Delaware No Drawing. Application June 20, 1950, Serial No. 169,290

19 Claims. (Cl. 260—79.5)

This invention relates to tetramethyl-thiuram-disulfide that has been treated to place it in a form which has improved milling and dispersing properties in elastoprenes and to the method for so treating the teramethyl-thiuram-disulfide.

Tetramethyl-thiuram-disulfide is a well known accelerator for the vulcanization of elastoprenes, such as natural and synthetic rubbers. Ordinarily, it is in the form of a fine dry powder and is incorporated in solid elastoprenes by milling on a rubber mill. When it is attempted to so incorporate the tetramethyl-thiuram-disulfide into an elastoprene, it flies as a dust, both during handling and at the rubber mill. Such dusting results in loss of valuable material, deposition thereof on the skin of the operator and inhalation thereof by the operator. Tetramethyl-thiuram-disulfide is irritating to the skin of many persons and its inhalation causes unpleasant physiological reactions.

Also, during such milling operations, the tetramethyl-thiuram-disulfide tends to cake on the back roll of the rubber mill, thereby lengthening the time cycle of the milling operation since the operator must scrape the caked material from the roll and again add it to the batch of elastoprene being milled. This problem of caking is especially severe when it is attempted to prepare a concentrated masterbatch of the accelerator in the elastoprene, and particularly when large commercial mills of 30 inch roll diameter or greater are used and the elastoprene temperatures become high. Because of the fluffy nature of powdered material, considerable operator attention time is required to incorporate this material on the mill in concentrated masterbatching. Tetramethyl-thiuram-disulfide, when milled into an elastoprene, must be dispersed uniformly therein without visible specks or agglomerates in order to assure uniform vulcanization of the rubber. This problem of dispersion is also accentuated by the use of concentrated masterbatching on roll type mills.

In the past, attempts have been made to reduce the dustiness of tetramethyl-thiuram-disulfide by adding various agents thereto, such as oils, at various stages of its manufacture, and selling the product as a ground powder. Although such products have been markedly less dusty than the untreated material, they definitely were not dustless. Furthermore, such treatments have not satisfactorily reduced the tendency of the tetramethyl-thiuram-disulfide to cake and fuse on the rolls of the mill, but, in some cases, have actually increased such tendency.

It is an object of my invention to produce tetramethyl-thiuram-disulfide in a form which is substantially dustless and which does not tend to cake and fuse on the rolls of rubber mills. Another object is to produce coated particles of tetramethyl-thiuram-disulfide which may be readily formed into dustless frangible compacted aggregates that have sufficient strength to withstand the normal conditions of handling, transportation and storage without becoming disintegrated to a material extent, but yet are sufficiently frangible to completely disintegrate into discrete particles upon being milled with unvulcanized rubber without dusting or caking on the rolls of the rubber mill. Still another object is to provied a novel process for improving the milling and dispersing properties of tetramethyl-thiuram-disulfide in an elastoprene. A further object is to provide a method for treating tetramethyl-thiuram-disulfide so that it will be substantially dustless and will not cake on the rolls of the rubber mill and, particularly, so that it may be readily shaped into dustless frangible compacted aggregates, and for preparing such aggregates. A still further object is to provide a solid vulcanizable elastoprene having dispersed therein from about 10% to about 30% by weight of the treated tetramethyl-thiuram-disulfide. Other objects are to provide new compositions of matter and to advance the art. Still other objects will appear hereinafter.

The above and other objects may be accomplished by coating finely divided particles of tetramethyl-thiuram-disulfide with from about 2% to about 6% by weight of a dialkyl phthalate which is liquid at 60° C. and in which each alkyl group contains from 1 to 6 carbon atoms, and from about 0.3% to about 2% by weight of sodium stearate; and, preferably, also with from about 0.2% to about 1% by weight of a sorbitan monoester of a fatty acid which is liquid at 60° C. and in which the fatty acid radical contains from 12 to 20 carbon atoms. Also, preferably, such particles are formed into dustless frangible compacted aggregates which have sufficient mechanical strength to withstand the normal conditions of handling, transportation and storage without material disintegration, and yet which disintegrate readily upon being milled with unvulcanized rubber.

The coated particles of tetramethyl-thiuram-disulfide are prepared by intimately mixing, with an aqueous slurry of finely divided tetramethyl-thiuram-disulfide, an aqueous dispersion of the dialkyl phthalate and the sodium stearate and, preferably, also the sorbitain monoester in the proportions by weight above recited based on the tetramethyl-thiuram-disulfide with thorough mixing, filtering out the resulting coated particles of tetramethyl-thiuram-disulfide from the aqueous solution and washing such particles with water; the mixing, filtering and washing operations being carried out at a temperature of from about 10° C. to about 80° C.

The resulting coated particles may be dried and then used for milling into an elastoprene. Such dry coated particles of tetramethyl-thiuram-disulfide are substantially non-dusting and non-caking, that is, they will not dust (fly) or cake on the rolls of rubber mills when they are milled into an elastoprene in the usual manner. They disperse into the elastoprene rapidly and in a uniform manner without being compacted into aggregates.

On the other hand, the coated particles of tetramethyl-thiuram-disulfide, with or without drying, may be readily formed into substantially dustless frangible compacted aggregates which have sufficient mechanical strength to resist disintegration in normal handling, transportation and storage, but which are sufficiently frangible to completely disintegrate into fine discrete particles when milled with an elastoprene on an ordinary rubber mill, and readily and rapidly disperse into the elastoprene in finely divided form in a uniform manner. Such aggregates may be prepared by compacting the washed particles under pressure into an apparently homogeneous, smoothly flowing plastic mass and then shaping such mass into aggregates of the desired size. Usually, such aggregates will have a width of $\frac{1}{16}$ to $\frac{1}{4}$ inch, a thickness from $\frac{1}{16}$ to $\frac{1}{4}$ inch and a length from $\frac{1}{16}$ to about 1 inch.

The slurry of tetramethyl-thiuram-disulfide may be made from ordinary dry powered tetramethyl-thiuram-disulfide, obtained by any of the known methods, by merely mixing the dry powder into water. The tetramethyl-thiuram-disulfide may be prepared by the oxidation of sodium dimethyl dithiocarbamate in aqueous solution by various oxidizing agents, such as hydrogen peroxide, nitrous acid, bromine, chlorine, sodium hypochlorite, etc., and filtering. It will usually be most convenient to treat the tetramethyl-thiuram-disulfide in the crude slurry obtained in its manufacture, particularly the slurry of tetramethyl-thiuram-disulfide obtained by reslurrying the wet filter cake and adjusting the pH to from about 7.5 to about 9.0. In either case, the tetramethyl-thiuram-disulfide, before and after coating, will be in finely divided form, substantially all of the particles being of a size to pass through a standard screen of about 100 mesh.

The dialkyl phthalate may be derived from any unsubstituted monohydric alcohol of the aliphatic series which contains from 1 to 6 carbon atoms, provided that the resultant ester is liquid at the temperature at which it is used, usually from about 30° C. to about 60° C. Suitable dialkyl phthalates are those derived from methyl alcohol, ethyl alcohol, propyl alcohol, butyl alcohol, amyl alcohol, hexyl alcohol, their isomers and mixtures of any 2 or more thereof. Thus, the alkyl groups in any dialkyl phthalate may be the same or different and mixtures of different dialkyl phthalates may be employed. Usually, dibutyl phthalate is preferred.

Preformed sodium stearate may be dispersed and added to the slurry of tetramethyl-thiuramdisulfide. Alternatively, a dispersion of stearic acid may be added to the slurry, provided that the pH of the slurry has been adjusted to 8 or higher with caustic soda or the like so that the stearic acid will be converted to its sodium salt. The final pH of the slurry of coated tetramethyl-thiuram-disulfide should be between 7 and 10.

While my process may be carried out in the absence of a sorbitan monoester of a fatty acid with good results and desirable products, particularly desirable results are obtained by the use of such ester. Such ester may be derived from any unsubstituted monocarboxylic fatty acid which contains from 12 to 20 carbon atoms, providing that the resulting ester is liquid at the temperature at which the dispersion is used, usually from about 30° C. to about 60° C. Suitable esters are sorbitan monolaurate, sorbitan monopalmitate, sorbitan monooleate and sorbitan monostearate. Of these, sorbitan monolaurate is preferred.

The dialkyl phthalate will be employed in a proportion of from about 2% to about 6% by weight based on the tetramethyl-thiuram-disulfide and, preferably, in a proportion of about 0.5%. The sodium stearate will be employed in a proportion of from about 0.3% to about 2% by weight based on the tetramethyl-thiuram-disulfide and, preferably, in a proportion of about 1%. The sorbitan monoester will be employed in a proportion of from about 0.2% to about 1% by weight based on the tetramethyl-thiuram-disulfide and, preferably, in a proportion of about 0.5%. Proportions of dialkyl phthalate and sodium stearate, materially smaller or larger than the ranges above given, fail to yield products having the desired properties.

The dialkyl phthalate, the sodium stearate or stearic acid and the sorbitan monoester may be simply mixed in water to provide the aqueous dispersion to be added to the slurry of tetramethyl-thiuram-disulfide. Preferably, however, the dispersion of the coating materials will be prepared with the aid of dispersing agents, such as the water-soluble alkali salts of long chain alkyl sulfonates, the water-soluble alkali salts of polynuclear aryl sulfonates, and the water-soluble alkali salts of the sulfates of long chain alcohols. The alkali salts will generally be ammonium, sodium or potassium salts. By "long chain" alkyl sulfonates or alcohols, I mean that the chains contain from about 12 to about 20 carbon atoms. The sulfonates will usually contain from 1 to 2 sulfonic acid groups. The polynuclear aryl sulfonates will contain from 2 to about 4 benzene rings, including fused rings as in naphthalene, and, except for the sulfonic acid groups, will consist of carbon and hydrogen. Such dispersing agents are usually employed in an amount substantially equal to the sodium stearate.

Preferably, the dispersions of the coating materials will be prepared at a temperature of from about 70° C. to about 90° C. Usually, however, the treatment of the slurry of tetramethyl-thiuram-disulfide with the dispersions should be carried out at a temperature of from about 10° C. to about 80° C. Preferably, such coating operation is carried out at temperatures of from about 30° C. to about 60° C.

After the coating materials have been added to the slurry of tetramethyl-thiuram-disulfide and thoroughly mixed therewith, the slurry will be filtered and the filter cake washed with water to free the coated tetramethyl-thiuram-disulfide from the liquid and from the wetting agents.

The coating materials are adsorbed on the tetramethyl-thiuram-disulfide particles and are not removed therefrom to any material extent by the washing. The resulting filter cake may be dried and ground to provide discrete coated particles of tetramethyl-thiuram-disulfide for milling with an elastoprene. Such dried particles may be compacted into dustless frangible compacted aggregates. Preferably, however, the wet filter cake will be compacted into aggregates and then dried to produce the desired dustless frangible compacted aggregates. Such washing, drying and compacting steps should be carried out at a temperature of from about 10° C. to about 80° C. and, preferably, at from about 30° C. to about 60° C.

A great variety of mechanical means are well known for compacting wet or dry materials into aggregates. Such means are suitable for forming the aggregates of my invention. Suitable mechanical means of this character are pelleting machines, roll mills, extruding machines, granulators, and the like. According to the type of mechanical means employed, the coated tetramethyl-thiuram-disulfide particles will be compressed into pellets, plates, sheets or rods which may then be shaped to aggregates of the desired size, as by molding, cutting or granulating. One particularly suitable method for forming aggregates of the desired size comprises extruding the material through an extruder which is fitted with knife blades which pass over the outside of the die plate and cut the extruded rods into the desired length; the length depending upon the speed or number of knives. The preferred method of forming the aggregates is that disclosed in Example 1.

The aggregates should have a width of from $\frac{1}{16}$ to $\frac{1}{4}$ inch, a thickness of from $\frac{1}{16}$ to $\frac{1}{4}$ inch and a length of from $\frac{1}{16}$ to about 1 inch; and, preferably, should have a width of about $\frac{1}{8}$ inch, a thickness of about $\frac{1}{8}$ inch and a length of from about $\frac{1}{8}$ to about 1 inch. The aggregates should have a mechanical strength such that they do not readily disintegrate to a powder under the conditions encountered in normal handling, transportation and storage, but should be sufficiently frangible that they readily disintegrate to their original discrete particles when they are milled with an unvulcanized elastoprene in the usual manner.

The mechanical strength of the aggregates may be measured by a ball mill test which consists in placing a 50 gram sample of the aggregate in a 16 ounce, wide mouth bottle together with 8 steel balls, each ball being about $\frac{1}{2}$ inch in diameter, then rotating the bottle end over end at 42 R. P. M. for 5 minutes, and then screening the product on a 16 mesh screen and determining the amount of material which passes through such screen. Aggregates, having the desired mechanical strength, should resist disintegration under such conditions to the extent that not more than substantially 5% thereof will be disintegrated sufficiently to pass through the 16 mesh screen.

I have found that aggregates, having the desired mechanical strength, are uniformly obtained most conveniently by compacting the washed, wet particles under pressure into an apparently homogeneous, smoothly flowing plastic mass which retains its shape, then shaping such mass into aggregates of the desired size by molding, cutting or granulating, and then drying. By "apparently homogeneous," I mean that the mass appears to be fused together and to be free of lumps, aggregates and other observable distinct parts. By "smoothly flowing plastic mass," I mean that the mass will flow in a smooth manner under deforming pressures without crumbling or breaking up into separate masses. By a mass "which retains its shape," I mean that the mass will retain its shape in the absence of external deforming pressure.

The coated tetramethyl-thiuram-disulfide particles and the dustless frangible compacted aggregates formed therefrom are particularly adapted for compounding with solid vulcanizable elastoprenes on the ordinary rubber mill, and, especially, for making masterbatches by milling into elastoprenes from about 10% to about 30% by weight of the coated tetramethyl-thiuram-disulfide based on the elastoprene. Such coated tetramethyl-thiuram-disulfide disperses rapidly and readily in the elastoprene with substantially no dusting and without caking or fusing on the rolls of the rubber mill.

The term "elastoprene" as applied herein and in the claims is employed in the sense proposed by Harry L. Fisher in his "Nomenclature of synthetic rubbers" appearing on pages 900 to 907 of Rubber Chemistry and Technology, volume 12 (1939). This term includes natural rubber, haloprene derivatives, such as chloroprene polymers and fluoroprene polymers, synthetic isoprene rubbers, synthetic butadiene polymers, mono- and di-methyl butadiene polymers, copolymers of butadienes and acrylic derivatives, and piperylene rubbers.

In order to more clearly illustrate my invention, preferred modes of carrying the same into effect and advantageous results to be obtained thereby, the following examples are given:

Example 1

1000 parts by weight (dry basis) of tetramethyl-thiuram-disulfide were prepared by the oxidation of a solution of sodium dimethyl dithiocarbamate with hydrogen peroxide and sulfuric acid at 10° C., and filtering the product. The wet filter cake was reslurried in 20,000 parts of water and the pH was adjusted to about 8.5 by the addition of sodium carbonate. Separately, 40 parts of dibutyl phthalate, 10 parts of sodium stearate, 5 parts of sorbitan monolaurate and 10 parts of a mixture of long chain alkyl sodium sulfonates, containing an average of 16 carbon atoms, were added to about 300 parts of water, and the resulting mixture was then heated to about 70° C. with mild stirring. The emulsion, thus obtained, was then added to the slurry of tetramethyl-thiuram-disulfide, the temperature of which was about 30° C. The slurry was agitated for 20 minutes to insure complete incorporation of the coating materials. The slurry was then filtered on a vacuum filter and washed with 1000 parts of water to remove any soluble inorganic salts ($Na_2SO_4$ is a by-product of the reaction by which the tetramethyl-thiuram-disulfide is formed.) The alkyl sodium sulfonate emulsifying agent was largely washed out at this point but the dibutyl phthalate, sodium stearate and sorbitan monolaurate are retained on the thiuram particles by absorption.

The resulting wet filter cake, containing 37.1% water, was then fed into a screw type extruder with a 12 inch internal diameter barrel equipped with a die plate having $\frac{3}{16}$ inch holes and extruded in the form of apparently homogeneous, smoothly flowing rods which retained their shape.

The resulting compressed rods from the extruding machine, without drying, were granulated in a well known commercial granulator which comprises a semicircular trough, the bottom of which is formed by a six mesh wire screen, provided on the inside with a series of blades arranged parallel to the axis of the trough and given a circular, back and forth or oscillating motion over the inner surface of the screen. These blades knead the extruded rods together into a mass and rub such mass through the screen. (The undried extruded material is sufficiently firm and non-cohesive to be handled as separate rods in the drying operation and yet readily coalesces when kneaded together.) The material issues from the under side of the screen as jointed continuous structures, each consisting of a series of short prisms of approximately ⅛ inch square cross section (corresponding to the orifices of the screen), with the direction of the sides changing through an angle at each joint (which corresponds to the reversal of the direction of travel of the blades which press the material through the screen). These joints are points of weakness in the extruded structures. As the latter grow longer, they break under their own weight at these points, forming aggregates consisting of several jointed prisms, with an overall length of about ⅛ to about ½ inch. The resulting aggregates were then dried in an air oven at about 70° C. The melting point of the dry product was 145.0° C. and the ash content was 0.2%. The aggregates were firm and did not readily disintegrate on handling, as is shown quantitatively below.

The length of the aggregates may be controlled by controlling the water content of the material granulated. Thus, at 25% water content, the length is about ⅛ to ½ inch, while at 50% water content, the length is about ½ to about 2 inches. Extrusion and granulation are most readily carried out with coated tetramethyl-thiuram-disulfide containing 25-50% water.

A two-pound sample of these aggregates of coated tetramethyl-thiuram-disulfide was tested by making up as a 20% masterbatch in pale crepe rubber on a 30 inch diameter roll mill with the temperature of the rolls held at 70° C. by internal hot water heating. The batch incorporated rapidly without dusting and with no caking on the back roll of the mill. At the end of milling, the rolls were clean and shining. A sample of the rubber was stretched out into a thin film and examined for undispersed particles of tetramethyl-thiuram-disulfide. The latter was completely dispersed in the rubber.

By way of comparison, two pounds of commercial, dry, uncoated tetramethyl-thiuram-disulfide were milled into pale crepe rubber under similar conditions. A considerable amount of unpleasant dusting occurred at the mill, the tetramethyl-thiuram-disulfide incorporated into the rubber slowly and fused on the back roll of the mill. It was necessary to scrape this fused material from the roll and add it back to the batch.

Example 2

Results, similar to those obtained in Example 1, were obtained when it was modified by using:

a. Stearic acid (instead of sodium stearate) which was converted into sodium stearate at the pH of the slurry. (The pH was not substantially changed by this addition.)

b. Sorbitan monostearate for sorbitan monolaurate.

c. The sodium salt of the dinapthyl methane sulfonic acids (made by condensing naphthalene, formaldehyde and sulfuric acid) for the sodium salt of the alkyl sulfonic acids.

When materially less than 2.0% of phthalate is used, the particles of tetramethyl-thiuram-disulfide are not sufficiently coherent. When materially less than 0.3% of sodium stearate is used, the compression step is accompanied by undue pressure since the particles do not have sufficient lubricity. The use of the sorbitan monoester also helps lubricity. On the other hand, materially larger proportions of the coating materials, than those hereinbefore specified, give aggregates which do not have the desired mechanical strength.

The aggregates, prepared according to the foregoing examples, were tested for mechanical strength by the ball mill test hereinbefore described, whereupon only about 2.5% of the starting material passed through the screen as "fines."

Example 3

This example illustrates the less desirable results that are obtained when lubricating oil is used, instead of my coating compositions. Under the same conditions as described in Example 1, an emulsion of "Circo Light Process Oil," a high naphthenic type of lubricating oil, at 3.0% by weight on the dry tetramethyl-thiuram-disulfide was made up in water, using 1.0% by weight of long chain alkyl sodium sulfonates as the emulsifier, and the resulting emulsion was added to the slurry of the tetramethyl-thiuram-disulfide. The filter cake was extruded and granulated at 40.0% water. On drying, the resulting granules were softer and disintegrated more readily than those of Example 1. The product melted at 145.2° C. When tested by masterbatching as before, there was a noticeable, objectionable amount of smoking at the mill due to the presence of the oil, and some caking on the back roll of the mill. When a sample of the milled rubber was stretched into a thin film, there were undesirable specks of undispersed tetramethyl-thiuram-disulfide present.

Similarly, replacing the dialkyl phthalate by commercial tricresyl phosphate gave much inferior results and the product was dark in color. Also, replacing the stearate by casein gave a product which contained agglomerates of tetramethyl-thiuram-disulfide which dispersed poorly in rubber.

It will be apparent that the preceding examples are given for illustrative purposes solely and that my invention is not limited to the specific embodiments disclosed therein. It will be readily apparent to those skilled in the art that many variations and modifications can be made in the dialkyl phthalate, the sorbitan ester and the mode of operation within the scope of my invention as hereinbefore disclosed, without departing from the spirit or scope of my invention.

The coated tetramethyl-thiuram-disulfide products of my invention are virtually dustless, have a greatly reduced tendency to cake on the back roll of the rubber mill during milling operations with the elastoprenes, and disperse in the elastoprenes at a much more rapid rate than the products of the prior art and, particularly, are superior in these respects to oil treated powders of tetramethyl-thiuram-disulfide. The dustless frangible compacted aggregates have the further advantages of being free-flowing as compared to ground powders, do not readily disintegrate back to powder during normal handling, and do not present the physiological hazards of the powders. Accordingly, the aggregates are much easier to handle and to incorporate in the elastoprenes. Furthermore, the formation of the material into aggregates makes it unnecessary to grind the material and hence substantial economies are obtained by eliminating the usual grinding step. The formation of the aggregates from the wet filter cake not only eliminates the grinding step, but has the further advantage that the material may be more readily dried, since the wet aggregates are suitable for continuous drying in a through-circulation type of air dryer. Also, the addition of the dialkyl phthalate and the sodium stearate to the slurry, obtained in the preparation of the tetramethyl-thiuram-disulfide, has the advantage of improving the filtration rate of the slurry. It will thus be apparent that my invention constitutes a valuable advance in and contribution to the art.

It will be noted that, by my invention, I impart apparently inconsistent and opposite properties to the particles of tetramethyl-thiuram-disulfide. For example, the particles may be compacted into aggregates under pressure, but do not cake on the rubber mill or form aggregates when milled with elastoprenes. Also, the compacted aggregates have considerable mechanical strength so as to resist disintegration during handling, but yet are frangible so that they readily disintegrate to their ultimate particles upon milling with an elastoprene. These are properties which the untreated tetramethyl-thiuram-disulfide does not have and which could not be obtained by the use of oils and similar expedients of the prior art.

I claim:

1. Particles of tetramethyl-thiuram-disulfide of a size to pass through a standard screen of substantially 100 mesh, coated with from about 2% to about 6% of a dialkyl phthalate which is liquid at 60° C. and in which each alkyl group contains from 1 to 6 carbon atoms and from about 0.3% to about 2% of sodium stearate.

2. Particles of tetramethyl-thiuram-disulfide of a size to pass through a standard screen of substantially 100 mesh, coated with from about 2% to about 6% of dibutyl phthalate and from about 0.3% to about 2% of sodium stearate.

3. Particles of tetramethyl-thiuram-disulfide of a size to pass through a standard screen of substantially 100 mesh, coated with from about 2% to about 6% of a dialkyl phthalate which is liquid at 60° C. and in which each alkyl group contains from 1 to 6 carbon atoms, from about 0.3% to about 2% of sodium stearate and from about 0.2% to about 1% of a sorbitan monoester of a fatty acid which is liquid at 60° C. and in which the fatty acid radical contains from 12 to 20 carbon atoms.

4. Particles of tetramethyl-thiuram-disulfide of a size to pass through a standard screen of substantially 100 mesh, coated with from about 2% to about 6% of dibutyl phthalate, from about 0.3% to about 2% of sodium stearate and from about 0.2% to about 1% of a sorbitan monoester of a fatty acid which is liquid at 60° C. and in which the fatty acid radical contains from 12 to 20 carbon atoms.

5. Particles of tetramethyl-thiuram-disulfide of a size to pass through a standard screen of substantially 100 mesh, coated with from about 2% to about 6% of a dialkyl which is liquid at 60° C. and in which each alkyl group contains from 1 to 6 carbon atoms, from about 0.3% to about 2% of sodium stearate and from about 0.2% to about 1% of sorbitan monolaurate.

6. Particles of tetramethyl-thriuram-disulfide of a size to pass through a standard screen of substantially 100 mesh, coated with from about 2% to about 6% of dibutyl phthalate, from about 0.3% to about 2% of sodium stearate and from about 0.2% to about 1% of sorbitan monolaurate.

7. Dustless frangible compacted aggregates of particles of tetramethyl-thiuram-disulfide of a size to pass through a standard screen of substantially 100 mesh, coated with from about 2% to about 6% of a dialkyl phthalate which is liquid at 60° C. and in which each alkyl group contains from 1 to 6 carbon atoms and from about 0.3% to about 2% of sodium stearate; said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

8. Dustless frangible compacted aggregates of particles of tetramethyl-thiuram-disulfide of a size to pass through a standard screen of substantially 100 mesh, coated with from about 2% to about 6% of dibutyl phthalate and from about 0.3% to about 2% of sodium stearate; said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

9. Dustless frangible compacted aggregates of particles of tetramethyl-thiuram-disulfide of a size to pass through a standard screen of substantially 100 mesh, coated with from about 2% to about 6% of a dialkyl phthalate which is liquid at 60° C. and in which each alkyl group contains from 1 to 6 carbon atoms, from about 0.3% to about 2% of sodium stearate and from about 0.2% to about 1% of a sorbitan monoester of a fatty acid which is liquid at 60° C. and in which the fatty acid radical contains from 12 to 20 carbon atoms; said aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch, and having a mechanical strength such that not more than substantially 5% thereof will be disintegrated sufficiently to pass through a 16 mesh screen when a 50 gram sample is tumbled in a 16 ounce bottle with eight $\frac{1}{2}$ inch steel balls at 42 R. P. M. for 5 minutes, but being sufficiently frangible to completely disintegrate to discrete particles upon being mixed with unvulcanized rubber.

10. Dustless frangible compacted aggregates of particles of tetramethyl-thiuram-disulfide of a size to pass through a standard screen of substantially 100 mesh, coated with from about 2% to about 6% of dibutyl phthalate, from about 0.3% to about 2% of sodium stearate and from about 0.2% to about 1% of sorbitan monolaurate; said aggregates having a width of from 1/16 to 1/4 inch, a thickness of from 1/16 to 1/4 inch, and a length of from 1/16 to about 1 inch, and having a mechanical strength such that not more than substantially 5% thereof will be disintegrated sufficiently to pass through a 16 mesh screen when a 50 gram sample is tumbled in a 16 ounce bottle with eight 1/2 inch steel balls at 42 R. P. M. for 5 minutes, but being sufficiently frangible to completely disintegrate to discrete particles upon being mixed with unvulcanized rubber.

11. Dustless frangible compacted aggregates of particles of tetramethyl-thiuram-disulfide of a size to pass through a standard screen of substantially 100 mesh, coated with from about 2% to about 6% of a dialkyl phthalate which is liquid at 60° C. and in which each alkyl group contains from 1 to 6 carbon atoms and from about 0.3% to about 2% of sodium stearate; said aggregates having a width of about 1/8 inch, a thickness of about 1/8 inch, and a length of from about 1/8 to about 1 inch, and having a mechanical strength such that not more than substantially 5% thereof will be disintegrated sufficiently to pass through a 16 mesh screen when a 50 gram sample is tumbled in a 16 ounce bottle with eight 1/2 inch steel balls at 42 R. P. M. for 5 minutes, but being sufficiently frangible to completely disintegrate to discrete particles upon being mixed with unvulcanized rubber.

12. Dustless frangible compacted aggregates of particles of tetramethyl-thiuram-disulfide of a size to pass through a standard screen of substantially 100 mesh, coated with from about 2% to about 6% of a dialkyl phthalate which is liquid at 60° C. and in which each alkyl group contains from 1 to 6 carbon atoms, from about 0.3% to about 2% of sodium stearate and from about 0.2% to about 1% of a sorbitan monoester of a fatty acid which is liquid at 60° C. and in which the fatty acid radical contains from 12 to 20 carbon atoms; said aggregates having a width of about 1/8 inch, a thickness of about 1/8 inch, and a length of from about 1/8 to about 1 inch, and having a mechanical strength such that not more than substantially 5% thereof will be disintegrated sufficiently to pass through a 16 mesh screen when a 50 gram sample is tumbled in a 16 ounce bottle with eight 1/2 inch steel balls at 42 R. P. M. for 5 minutes, but being sufficiently frangible to completely disintegrate to discrete particles upon being mixed with unvulcanized rubber.

13. The process of improving the milling and dispersing properties of tetramethyl-thiuram-disulfide in an elastoprene which comprises intimately mixing an aqueous dispersion of a dialkyl phthalate which is liquid at 60° C. and in which each alkyl group contains from 1 to 6 carbon atoms and of sodium stearate with an aqueous slurry of finely divided tetramethyl-thiuram-disulfide, the dialkyl phthalate being used in a proportion of from about 2% to about 6% by weight based on the tetramethyl-thiuram-disulfide and the sodium stearate being used in a proportion of from about 0.3% to about 2% by weight based on the tetramethyl-thiuram-disulfide, filtering out the resulting coated particles of tetramethyl-thiuram-disulfide from the aqueous solution, and washing such particles with water; the mixing, filtering and washing being carried out at a temperature of from about 10° C. to about 80° C.

14. The process of improving the milling and dispersing properties of tetramethyl-thiuram-disulfide in an elastoprene which comprises intimately mixing an aqueous dispersion of dibutyl phthalate and of sodium stearate with an aqueous slurry of finely divided tetramethyl-thiuram-disulfide, the dibutyl phthalate being used in a proportion of from about 2% to about 6% by weight based on the tetramethyl-thiuram-disulfide and the sodium stearate being used in a proportion of from about 0.3% to about 2% by weight based on the tetramethyl-thiuram-disulfide, filtering out the resulting coated particles of tetramethyl-thiuram-disulfide from the aqueous solution, and washing such particles with water; the mixing, filtering and washing being carried out at a temperature of from about 10° C to about 80° C.

15. The process of improving the milling and dispersing properties of tetramethyl-thiuram-disulfide in an elastoprene which comprises intimately mixing an aqueous dispersion of a dialkyl phthalate which is liquid at 60° C. and in which each alkyl group contains from 1 to 6 carbon atoms, of sodium stearate and of a sorbitan monoester of a fatty acid which is liquid at 60° C. and in which the fatty acid radical contains from 12 to 20 carbon atoms with an aqueous slurry of finely divided tetramethyl-thiuram-disulfide, the dialkyl phthalate being used in a proportion of from about 2% to about 6% by weight, the sodium stearate being used in a proportion of from about 0.3% to about 2% by weight and the sorbitan monoester being used in a proportion of from about 0.2% to about 1% by weight, all based on the tetramethyl-thiuram-disulfide, filtering out the resulting coated particles of tetramethyl-thiuram-disulfide from the aqueous solution, and washing such particles with water; the mixing, filtering and washing being carried out at a temperature of from about 10° C. to about 80° C.

16. The process of improving the milling and dispersing properties of tetramethyl-thiuram-disulfide in an elastoprene which comprises intimately mixing an aqueous dispersion of dibutyl phthalate, of sodium stearate and of a sorbitan monoester of a fatty acid which is liquid at 60° C. and in which the fatty acid radical contains from 12 to 20 carbon atoms with an aqueous slurry of finely divided tetramethyl-thiuram-disulfide, the dibutyl phthalate being used in a proportion of from about 2% to about 6% by weight, the sodium stearate being used in a proportion of from about 0.3% to about 2% by weight and the sorbitan monoester being used in a proportion of from about 0.2% to about 1% by weight, all based on the tetramethyl-thiuram-disulfide, filtering out the resulting coated particles of tetramethyl-thiuram-disulfide from the aqueous solution, and washing such particles with water; the mixing, filtering and washing being carried out at a temperature of from about 10° C. to about 80° C.

17. The process of improving the milling and dispersing properties of tetramethyl-thiuram-disulfide in an elastoprene which comprises intimately mixing an aqueous dispersion of dibutyl phthalate, of sodium stearate and of sorbitan monolaurate with an aqueous slurry of finely divided tetramethyl-thiuram-disulfide, the dibutyl phthalate being used in a proportion of from about 2% to about 6% by weight, the sodium stearate being used in a proportion of from about 0.3% to about 2% by weight and the sorbitan monolaurate being used in a proportion of from about 0.2% to about 1% by weight, all based on the tetramethyl-thiuram-disulfide, filtering out the resulting coated particles of tetramethyl-thiuram-disulfide from the aqueous solution, and washing such particles with water; the mixing, filtering and washing being carried out at a temperature of from about 10° C. to about 80° C.

18. The process of improving the milling and dispersing properties of tetramethyl-thiuram-disulfide in an elastoprene which comprises intimately mixing an aqueous dispersion of a dialkyl phthalate which is liquid at 60° C. and in which each alkyl group contains from 1 to 6 carbon atoms and of sodium stearate with an aqueous slurry of finely divided tetramethyl-thiuram-disulfide, the dialkyl phthalate being used in a proportion of from about 2% to about 6% by weight based on the tetramethyl-thiuram-disulfide and the sodium stearate being used in a proportion of from about 0.3% to about 2% by weight based on the tetramethyl-thiuram-disulfide, filtering out the resulting coated particles of tetramethyl-thiuram-disulfide from the aqueous solution, washing such particles with water; the mixing, filtering and washing being carried out at a temperature of from about 10° C. to about 80° C.; compacting the washed particles under pressure into an apparently homogeneous smoothly flowing plastic mass and then shaping such mass into aggregates having a width of from $\frac{1}{16}$ to $\frac{1}{4}$ inch, a thickness of from $\frac{1}{16}$ to $\frac{1}{4}$ inch, and a length of from $\frac{1}{16}$ to about 1 inch.

19. The process of improving the milling and dispersing properties of tetramethyl-thiuram-disulfide in an elastoprene which comprises intimately mixing an aqueous dispersion of a dialkyl phthalate which is liquid at 60° C. and in which each alkyl group contains from 1 to 6 carbon atoms, of sodium stearate and of a sorbitan monoester of a fatty acid which is liquid at 60° C. and in which the fatty acid radical contains from 12 to 20 carbon atoms with an aqueous slurry of finely divided tetramethyl-thiuram-disulfide, the dialkyl phthalate being used in a proportion of from about 2% to about 6% by weight, the sodium stearate being used in a proportion of from about 0.3% to about 2% by weight and the sorbitan monoester being used in a proportion of from about 0.2% to about 1% by weight, all based on the tetramethyl-thiuram-disulfide, filtering out the resulting coated particles of tetramethyl-thiuram-disulfide from the aqueous solution, washing such particles with water; the mixing, filtering and washing being carried out at a temperature of from about 10° C. to about 80° C.; compacting the washed particles under pressure into an apparently homogeneous smoothly flowing plastic mass and then shaping such mass into aggregates having a width of about $\frac{1}{8}$ inch, a thickness of about $\frac{1}{8}$ inch, and a length of from about $\frac{1}{8}$ to about 1 inch.

MARTIN L. NADLER.

REFERENCES CITED

The following references are of record in the file of this patent:

UNITED STATES PATENTS

| Number | Name | Date |
|---|---|---|
| 2,326,984 | Tomlin | Aug. 17, 1943 |
| 2,427,238 | Swart | Sept. 9, 1947 |
| 2,528,186 | Stanley | Oct. 31, 1950 |